(12) United States Patent
Odean et al.

(10) Patent No.: US 8,972,770 B1
(45) Date of Patent: Mar. 3, 2015

(54) SYSTEMS AND METHODS FOR CONDUCTING EXPERIMENTS ON APPLICATIONS

(71) Applicant: Google Inc., Mountain View, CA (US)

(72) Inventors: Tyler William Odean, San Francisco, CA (US); Ilya Mikhailovich Sherman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 13/649,952

(22) Filed: Oct. 11, 2012

(51) Int. Cl.
*G06F 11/00* (2006.01)

(52) U.S. Cl.
USPC ............................................................ 714/1

(58) Field of Classification Search
CPC .............. G06F 11/008; G06F 11/3668; G06F 11/3672; G06F 11/3676
USPC ...................................................... 714/1, 25
See application file for complete search history.

(56) References Cited

U.S. PATENT DOCUMENTS

| | | | |
|---|---|---|---|
| 8,185,608 B1* | 5/2012 | York et al. | 709/218 |
| 2006/0064339 A1* | 3/2006 | Allred | 705/9 |
| 2009/0183084 A1* | 7/2009 | Robertson | 715/744 |
| 2012/0233505 A1* | 9/2012 | Acharya et al. | 714/32 |

* cited by examiner

*Primary Examiner* — Scott Baderman
*Assistant Examiner* — Joseph Kudirka
(74) *Attorney, Agent, or Firm* — McDermott Will & Emery LLP

(57) ABSTRACT

Systems and methods for conducting a set of experiments on an application having a plurality of users are provided. Each experiment is identified by a respective experiment identification (ID) and is associated with a respective group of experimental variations of the application. A system includes an entropy source module that assigns a user group number to a designated user. The user group number is less than or equal to an entropy cap, which is less than an expected entropy, which represents a total number of different states of the experiments. The system includes an experiment module that determines a designated one of the experiments to be conducted on the application. The designated experiment is identified by a designated experiment ID and is associated with a designated group of experimental variations of the application. The experiment module assigns a designated variation to the designated user based on the user group number.

20 Claims, 6 Drawing Sheets

400

SYSTEMS AND METHODS FOR CONDUCTING EXPERIMENTS ON APPLICATIONS

FIELD

The subject technology generally relates to conducting experiments and, in particular, relates to systems and methods for conducting experiments on applications.

BACKGROUND

When providing an application to a population of users, it may be useful to allow users to consent to reporting anonymous usage statistics of the application so that these usage statistics may be used to improve the application. In this regard, an experiment to test different variations of the application can be conducted (e.g., by assigning different variations to different users). The anonymous usage statistics of the users who consented can be compared to one another in order to determine which variation provided better performance and therefore can be used to improve the application. However, the more experiments that are conducted and/or the fewer users there are may mean that a particular user can be inadvertently assigned a unique set of variations (e.g., different from other users' assigned variations), thereby potentially making this particular user more uniquely identifiable.

SUMMARY

According to various aspects of the subject technology, a system for conducting a set of experiments on an application having a plurality of users is provided. Each experiment is identified by a respective experiment identification (ID) and is associated with a respective group of experimental variations of the application. The system comprises an entropy source module configured to assign a user group number to a designated one of the plurality of users. The user group number is less than or equal to an entropy cap. The entropy cap is less than an expected entropy associated with the set of experiments. The expected entropy represents a total number of different states of the set of experiments. Each of the different states comprises a respective experimental variation of each experiment. The system also comprises an experiment module configured to determine a designated one of the set of experiments to be conducted on the application in connection with the designated user. The designated experiment is identified by a designated experiment ID and is associated with a designated group of experimental variations of the application. The experiment module is configured to assign a designated one of the designated group of experimental variations to the designated user based on the user group number.

According to various aspects of the subject technology, a computer-implemented method for conducting a set of experiments on an application having a plurality of users is provided. Each experiment is identified by a respective experiment identification (ID) and is associated with a respective group of experimental variations of the application. The method comprises assigning a user group number to a designated one of the plurality of users. The user group number is less than or equal to an entropy cap. The entropy cap is less than an expected entropy associated with the set of experiments. The expected entropy represents a total number of different states of the set of experiments. Each of the different states comprises a respective experimental variation of each experiment. The method also comprises determining a designated one of the set of experiments to be conducted on the application in connection with the designated user. The designated experiment is identified by a designated experiment ID and is associated with a designated group of experimental variations of the application. The method also comprises assigning a designated one of the designated group of experimental variations to the designated user based on the user group number and the designated experiment ID.

According to various aspects of the subject technology, a machine-readable medium encoded with executable instructions for a method of conducting a set of experiments on an application having a plurality of users is provided. Each experiment is identified by a respective experiment identification (ID) and is associated with a respective group of experimental variations of the application. The method comprises randomly assigning a user group number to a designated one of the plurality of users. The user group number is greater than zero and less than or equal to an entropy cap. The entropy cap is less than an expected entropy associated with the set of experiments. The expected entropy represents a total number of different states of the set of experiments. Each of the different states comprises a respective experimental variation of each experiment. The method also comprises determining a designated one of the set of experiments to be conducted on the application in connection with the designated user. The designated experiment is identified by a designated experiment ID and is associated with a designated group of experimental variations of the application. The method also comprises assigning a designated one of the designated group of experimental variations to the designated user based on the user group number and the designated experiment ID. The method also comprises tagging usage statistics of the designated user with the designated experimental variation.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

Figure 1A:
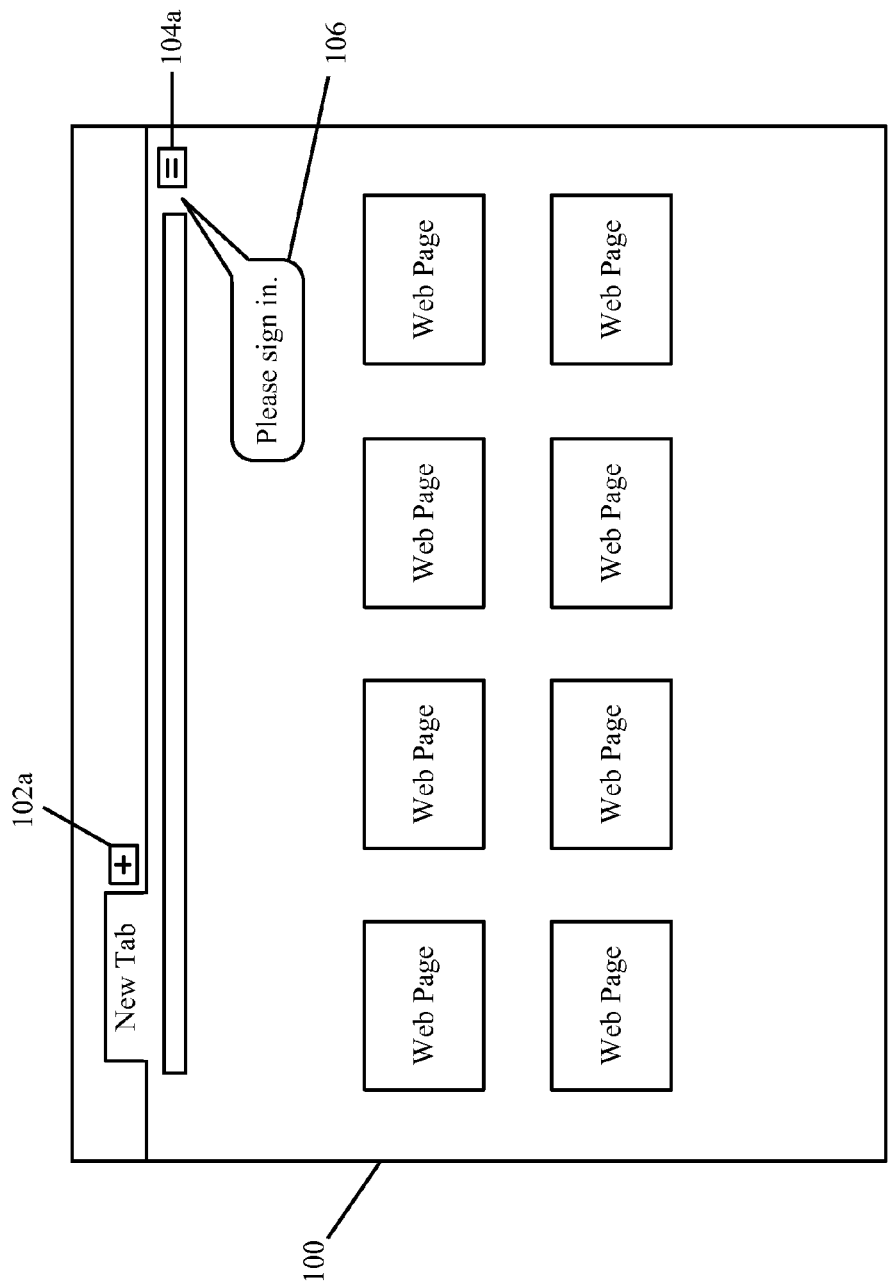
FIGS. 1A and 1B illustrate an example of an application on which a set of experiments can be conducted, in accordance with various aspects of the subject technology.
Figure 1B:
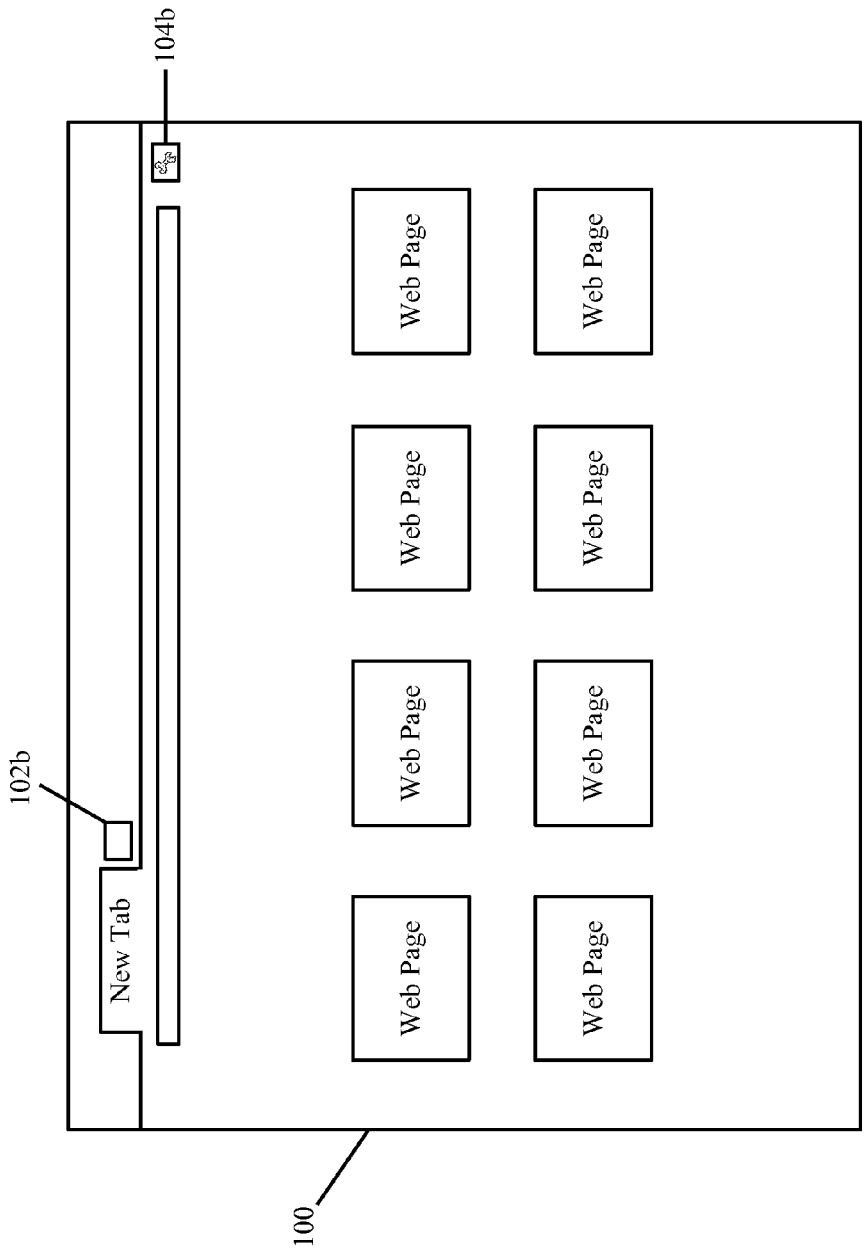

FIGS. 1A and 1B illustrate an example of application 100 on which a set of experiments can be conducted, in accordance with various aspects of the subject technology. Although application 100 is shown in FIGS. 1A and 1B as a web browser, application 100 can be other types of applications such as productivity tools (e.g., word processing programs, calendar programs, database programs, etc.), social networking programs, multimedia programs (e.g., for video, audio, and/or image editing and/or playback, etc.), communication programs (e.g., email programs, phone/contacts programs, texting programs, etc.), and the like.

The set of experiments can be conducted on application 100 in order to test different variations of the application (e.g., by assigning different variations to different users). Users of application 100 may be provided with an opportunity to control whether any activity of the users may be anonymously reported as usage statistics to a provider of application 100 in order to improve application 100. Should a user consent, this user's usage statistics may be tagged with the specific variation assigned to this user and then be reported to the provider. The anonymous usage statistics of the users can be compared to one another in order to determine which variation provided better performance and therefore can be used to improve application 100. The usage statistics, for example, can include information such as the number of tabs that were open, the use of any particular settings, the length of time spent on performing an activity, whether the user signed in to a particular service, etc.

For example, one experiment that can be conducted on application 100 is to determine the effect of having a "+" sign depicted on new tab button 102a (e.g., shown in FIG. 1A and referred to as variation A) versus having no "+" sign depicted on new tab button 102b (e.g., shown in FIG. 1B and referred to as variation B). This experiment may be identified by an experiment identification (ID) of 1 and be associated with the group of experimental variations A and B. Another experiment that can be conducted on application 100 is to determine the effect of having striped lines depicted on settings button 104a (e.g., shown in FIG. 1A and referred to as variation C) versus having a wrench depicted on settings button 104b (e.g., shown in FIG. 1B and referred to as variation D). This experiment may be identified by an experiment ID of 2 and be associated with the group of experimental variations C and D. Another experiment that can be conducted on application 100, for example, is to determine the effect of having a sign-in reminder 106 (e.g., shown in FIG. 1A and referred to as variation E) versus having no sign-in reminder (e.g., shown in FIG. 1B and referred to as variation F). This experiment may be identified by an experiment ID of 3 and be associated with the group of experimental variations E and F. Although only several experiments with two variations each are described, any number of experiments with any number of variations can be conducted on application 100.

To conduct all three experiments, a particular user may be assigned either variation A or variation B from experiment 1, either variation C or variation D from experiment 2, and either variation E or variation F from experiment 3. For example, the user may be assigned variations A, C, and E. Thus, this user may be considered as assigned to a state of A, C, and E. The following is a list of all the different states that a user may be assigned to for experiments 1, 2, and 3:

ACE
ACF
ADE
ADF
BCE
BCF
BDE
BDF

Thus, the total number of different states of experiments 1, 2, and 3 is 8. This total number may be referred to as the expected entropy associated with the set of experiments conducted on application 100. However, the problem with conducting experiments in this manner is that the more experiments that are conducted and/or the fewer users there are may mean that a particular user can be inadvertently assigned a unique state, thereby potentially making this particular user more uniquely identifiable. For example, if the number of users of application 100 is less than the expected entropy (e.g., there are only five users of application 100), then each of these users may potentially be assigned a unique state, and therefore may be potentially identified.

According to various aspects of the subject technology, systems and methods are provided for conducting a set of experiments on application 100 while reducing the risk of uniquely identifying a particular user. This can be achieved by capping the expected entropy associated with the set of experiments with an entropy cap such that each user cannot be assigned a unique state. In other words, the expected entropy may be capped such that it is likely that more than one user can be assigned the same state. A user group number that is less than or equal to the entropy cap may be randomly assigned to a particular user. Since this user group number is not unique to this particular user, an experimental variation can be assigned to this user based on the user group number, thereby minimizing the risk of uniquely identifying this particular user.

Figure 2:
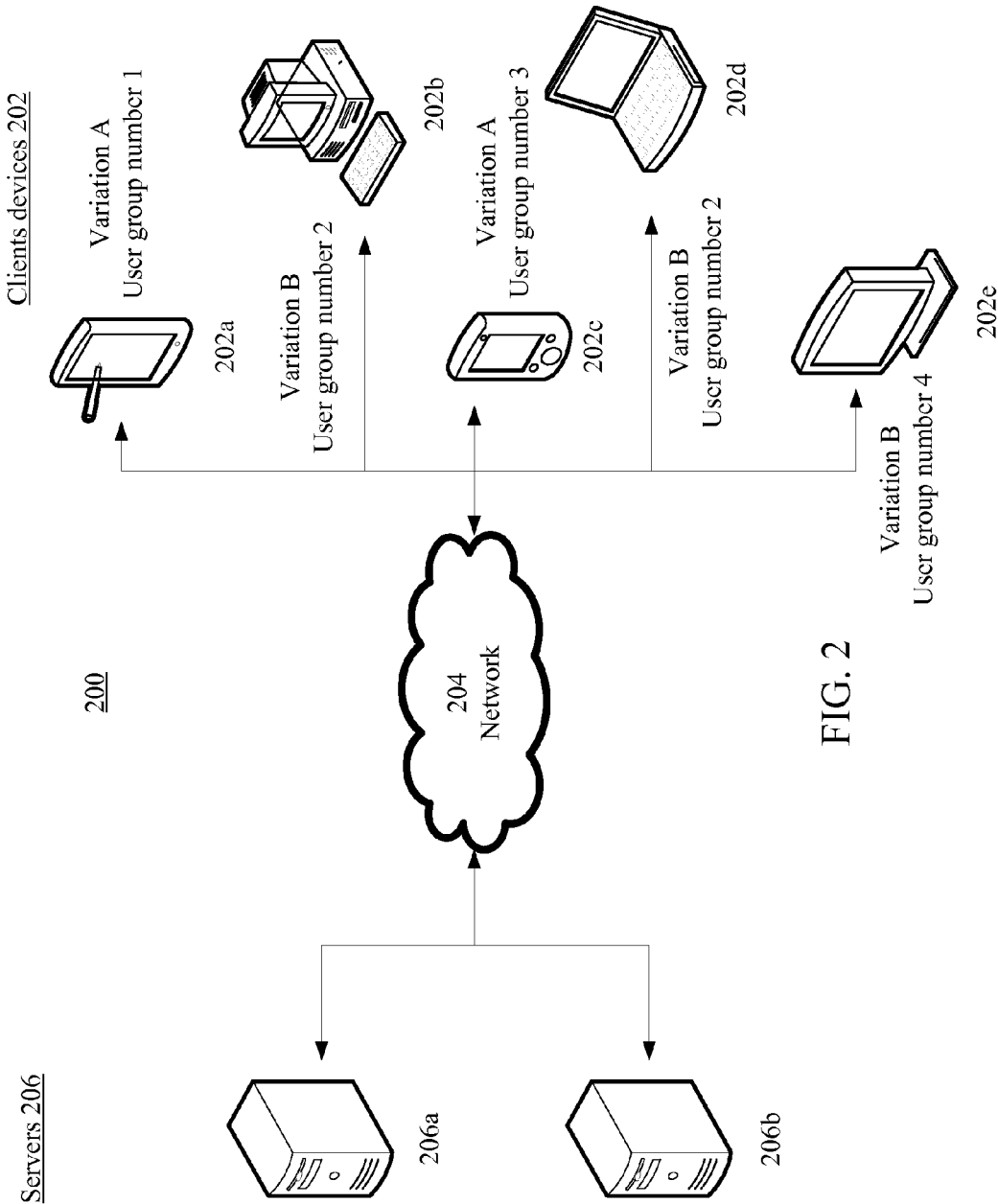
FIG. 2 illustrates an example of an arrangement in which a set of experiments may be conducted on an application, in accordance with various aspects of the subject technology.

FIG. 2 illustrates an example of arrangement 200 in which a set of experiments may be conducted on application 100, in accordance with various aspects of the subject technology. Arrangement 200 includes one or more servers 206 (e.g., servers 206a and 206b) and client devices 202 (e.g., client devices 202a, 202b, 202c, 202d, and 202e) connected over network 204. Network 204 can include, for example, any one or more of a personal area network (PAN), a local area network (LAN), a campus area network (CAN), a metropolitan area network (MAN), a wide area network (WAN), a broadband network (BBN), a peer-to-peer network, an ad-hoc network, the Internet, and the like. Further, network 204 can include, but is not limited to, any one or more network topologies such as a bus network, a star network, a ring network, a mesh network, a star-bus network, tree or hierarchical network, and the like.

Servers 206, for example, may provide application 100 to a population of users using client devices 202. Client devices 202 and servers 206 can be any electronic device having processing hardware, memory, and communications capability necessary to perform some or all of the operations disclosed herein. Client devices 202, for example, can be desktop computers (e.g., client device 202b), laptop computers (e.g., client device 202*d*), tablet computers (e.g., including e-book readers such as client device 202*a*), mobile devices (e.g., smartphones or personal digital assistants such as client device 202*c*), set top boxes (e.g., for a television with one or more processors coupled thereto and/or embedded therein such as client device 202*e*), video game consoles, and/or any other electronic devices having memory, processing hardware, and communications capabilities for performing one or more operations according to certain aspects of this disclosure.

In some aspects, servers 206 may randomly assign user group numbers to client devices 202 and then assign different variations of application 100 to client devices 202 based on the assigned user group numbers in order to conduct the set of experiments on application 100. For example, servers 206 may assign a user group number of 1 to client device 202*a*, a user group number of 2 to client devices 202*b* and 202*d*, a user group number of 3 to client device 202*c*, and a user group number of 4 to client device 202*e*. Based on these user group numbers, servers 206 may provide variation A to client devices 202*a* and 202*c*, and provide variation B to client devices 202*b*, 202*d*, and 202*e*. Usage statistics of client devices 202, which may be tagged with the different variations of application 100, may be reported back to servers 206 over network 204, thereby allowing a provider of application 100 to determine how to improve application 100 based on this information.

Figure 3:
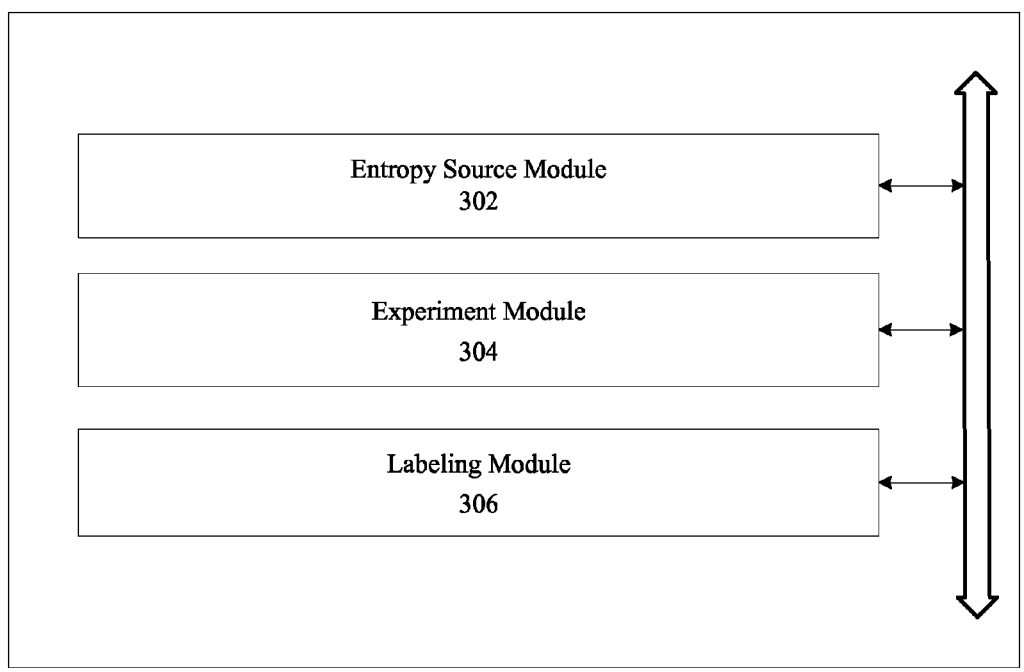
FIG. 3 illustrates an example of a system for conducting a set of experiments on an application, in accordance with various aspects of the subject technology.

FIG. 3 illustrates an example of system 300 for conducting a set of experiments on application 100, in accordance with various aspects of the subject technology. System 300, for example, may be part of client devices 202 and/or servers 206. System 300 comprises entropy source module 302, experiment module 304, and labeling module 306. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Additional features and functions of these modules according to various aspects of the subject technology are further described in the present disclosure.

Figure 4:
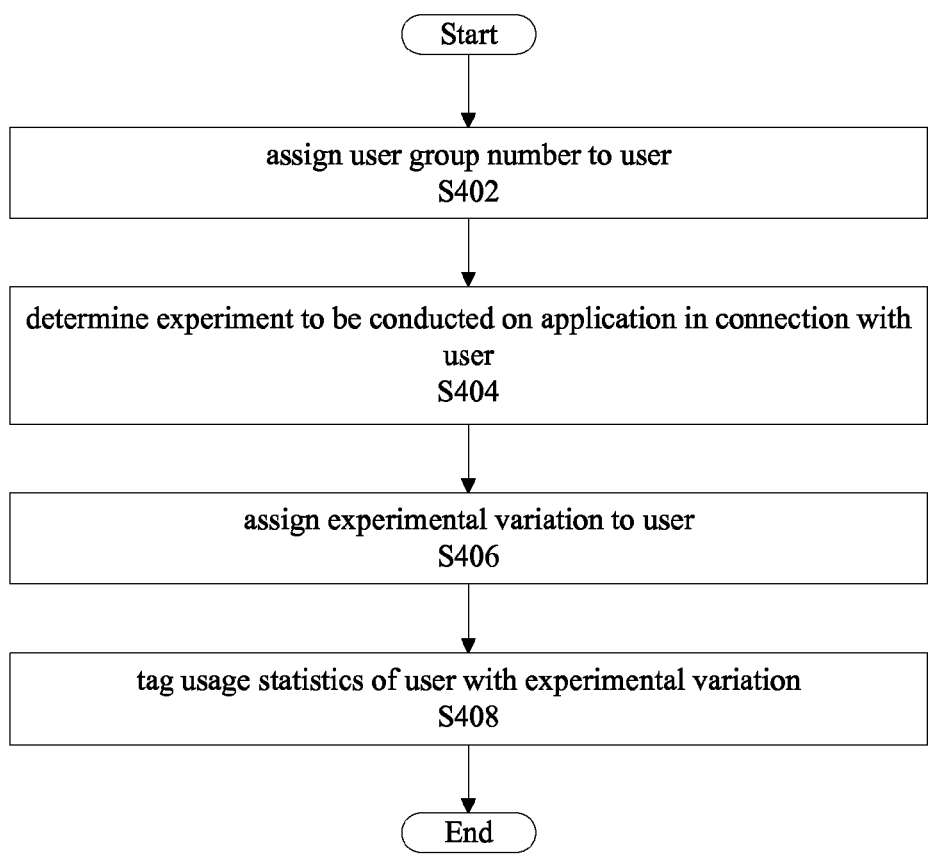
FIG. 4 illustrates an example of a method for conducting a set of experiments on an application, in accordance with various aspects of the subject technology.

FIG. 4 illustrates an example of method 400 for conducting a set of experiments on application 100, in accordance with various aspects of the subject technology. In particular, method 400 may be implemented to assign a particular variation of application 100 to a user while reducing the risk of uniquely identifying this user. System 300, for example, may be used to implement method 400. However, method 400 may also be implemented by systems having other configurations. Although method 400 is described herein with reference to the examples of FIGS. 1A, 1B, 2, 3, and 5, method 400 is not limited to these examples.

According to step S402, entropy source module 302 assigns a user group number to a particular one of the plurality of users of application 100 (e.g., a designated user). As discussed above, the user group number may be less than or equal to an entropy cap that caps the expected entropy associated with the set of experiments, thereby making the user group number not unique to the designated user. In this regard, an experimental variation can be assigned to the designated user based on the assigned user group number, thereby minimizing the risk of uniquely identifying this user.

For the purpose of illustration, assume that there are only 8 users of application 100, and that experiments 1, 2, and 3 are to be conducted on application 100. As discussed above, the expected entropy associated with these experiments is 8 (e.g., 8 total different states that a user may be assigned to). Since there are only 8 users of application 100, it may be possible that each user is assigned a unique state. The entropy cap, however, may be used to address this problem. The entropy cap may be a number (e.g., an integer) that is less than the expected entropy. For the purpose of illustration, assume that the entropy cap in this example is 4. The user group number, which may be a number (e.g., an integer) greater than zero and less than or equal to the entropy cap, may then be randomly assigned to each of the 8 users. Because the user group number is less than or equal to the entropy cap, it is likely that more than one of the 8 users may share the same user group number. For example, two users may share a user group number of 1, two other users may share a user group number of 2, two other users may share a user group number of 3, and two other users may share a user group number of 4. Thus, the assigned user group number is not unique to a particular user, including the designated user.

According to step S404, experiment module 304 determines a particular one of the set of experiments to be conducted on application 100 in connection with the designated user. For example, experiment module 304 may select either experiment 1, experiment 2, or experiment 3 to be conducted on application 100 in connection with the designated user. In some aspects, the provider of application 100 may select the experiment to be conducted on application 100. For ease of discussion, the selected experiment may be referred to as the designated experiment.

According to step S406, experiment module 304 assigns one of the experimental variations associated with the designated experiment to the designated user based on the assigned user group number. Because the assigned user group number is not unique to the designated user, the experimental variation that is assigned to the designated user may also not be unique to the designated user, thereby minimizing the risk of uniquely identifying the designated user.

According to certain aspects, experimental module 304 may assign one of the experimental variations associated with the designated experiment to the designated user based on the assigned user group number as well as the experiment ID of the designated experiment, which may allow for a specific variation from the designated experiment to be assigned to the designated user. For example, assume that the designated experiment is experiment 1, and the assigned user group number is 3. Thus, experiment module 304 may assign either variation A or variation B to the designated user based on the assigned user group number 3 and the experiment ID 1.

In some aspects, experiment module 304 may determine which variation to assign the designated user using a function that can increase the likelihood that each variation of the designated experiment may be assigned to the plurality of users using application 100. For example, the function may increase the likelihood that if variation A is assigned to the designated user, the other variation, variation B, may be assigned to a different user, thereby ensuring that experiment 1 can be conducted on application 100. According to certain aspects, such a function may be given by:

(X+Y) modulo Z, where X=the designated experiment ID,

Y=the user group number, and

Z=a total number of experimental variations associated with the designated experiment.

The total number of different results of this function for a given experiment may be the same as the number of variations associated with that experiment. In this regard, each variation associated with an experiment may be assigned to a unique result of this function, and if such a result is computed by the function, experiment module 304 may assign the variation corresponding to the computed result to the designated user. For example, suppose variation A is assigned to a unique result of 0 computed by the function for experiment 1, while variation B is assigned to a unique result of 1 computed by the function for experiment 1. Using the values from the previous illustration, X=1 (e.g., from the experiment ID of 1), Y=3 (e.g., from the assigned user group number), and Z=2 (e.g., since experiment 1 is associated with two variations). Thus, the result of the function using these values is 0. Since variation A is assigned to the unique result of 0, experiment module 304 may assign variation A to the designated user. If the designated user were assigned a different user group number such as 2, then the result of the function would be 1. In this case, experiment module 304 would assign variation B to the designated user since variation B is assigned to the unique result of 1.

According to step S408, labeling module 306 may tag usage statistics of the designated user with the assigned experimental variation. For example, labeling module 306 may tag the usage statistics of the designated user with either variation A or variation B. These usage statistics along with the tag may then be provided to servers 206 so that the provider of application 100 may analyze this information and determine how to improve application 100. Although the set of experiments is described as being conducted in connection with several users, the set of experiments can be conducted in connection with any number of users.

Figure 5:
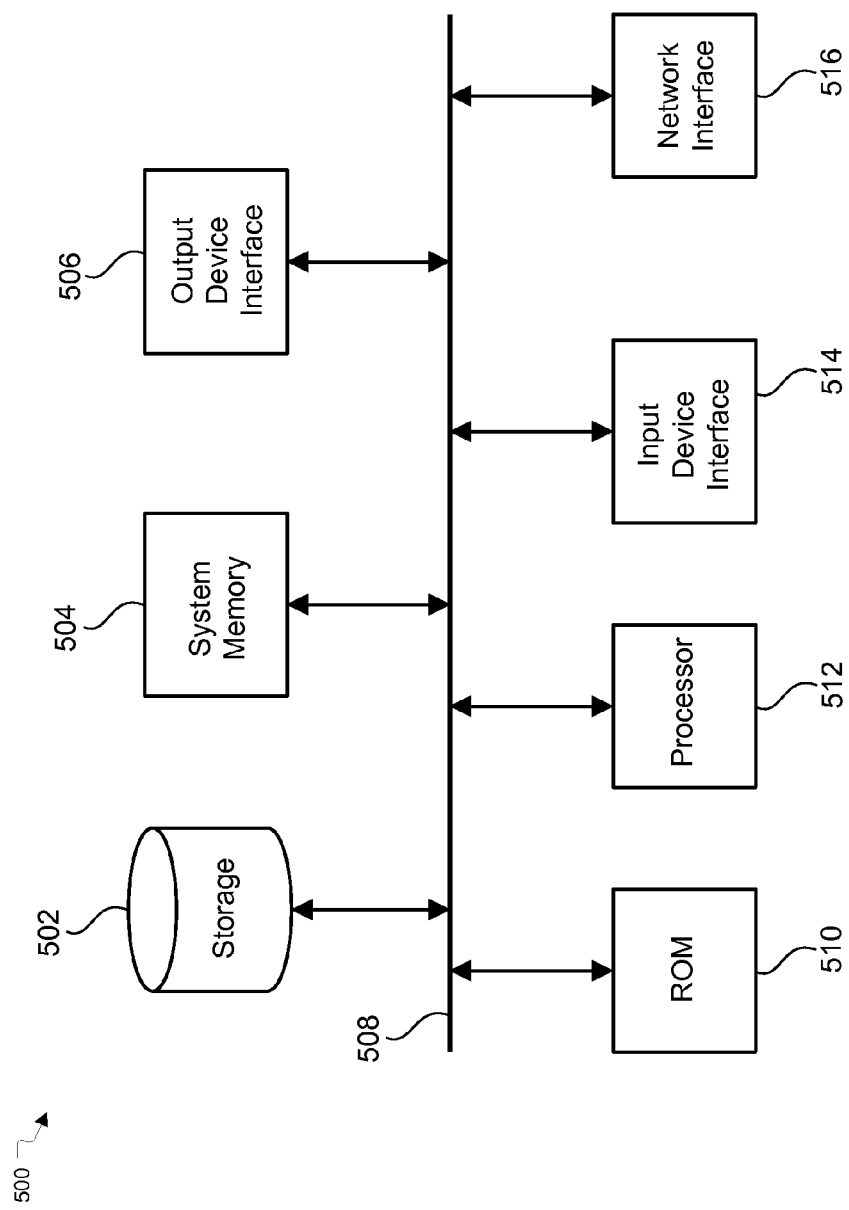
FIG. 5 conceptually illustrates an electronic system with which any implementations of the subject technology are implemented.

FIG. 5 conceptually illustrates electronic system 500 with which any implementations of the subject technology are implemented. Electronic system 500, for example, can be a desktop computer, a laptop computer, a tablet computer, a server, a phone, a personal digital assistant (PDA), any device that can be used for conducting a set of experiments on an application, or generally any electronic device that transmits signals over a network. Such an electronic system includes various types of computer readable media and interfaces for various other types of computer readable media. Electronic system 500 includes bus 508, processing unit(s) 512, system memory 504, read-only memory (ROM) 510, permanent storage device 502, input device interface 514, output device interface 506, and network interface 516, or subsets and variations thereof.

Bus 508 collectively represents all system, peripheral, and chipset buses that communicatively connect the numerous internal devices of electronic system 500. In one or more implementations, bus 508 communicatively connects processing unit(s) 512 with ROM 510, system memory 504, and permanent storage device 502. From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. One or more implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores any of the instructions and data that processing unit(s) 512 needs at runtime. In one or more implementations, the processes of the subject disclosure are stored in system memory 504, permanent storage device 502, and/or ROM 510. From these various memory units, processing unit(s) 512 retrieves instructions to execute and data to process in order to execute the processes of one or more implementations.

Bus 508 also connects to input and output device interfaces 514 and 506. Input device interface 514 enables a user to communicate information and select commands to the electronic system. Input devices used with input device interface 514 include, for example, alphanumeric keyboards and pointing devices (also called "cursor control devices"). Output device interface 506 enables, for example, the display of images generated by electronic system 500. Output devices used with output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, bus 508 also couples electronic system 500 to a network (not shown) through network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system for conducting a set of experiments on an application having a plurality of users, wherein each experiment is identified by a respective experiment identification (ID) and is associated with a respective group of experimental variations of the application, the system comprising:
one or more processors; and
a memory containing processor-executable instructions that, when executed by the one or more processors, cause the system to:
assign a user group number to a designated one of the plurality of users, the user group number being less than or equal to an entropy cap, the entropy cap being less than an expected entropy associated with the set of experiments, the expected entropy representing a total number of different states of the set of experiments, each of the different states comprising a respective experimental variation of each experiment;
determine a designated one of the set of experiments to be conducted on the application in connection with the designated user, wherein the designated experiment is identified by a designated experiment ID and is associated with a designated group of experimental variations of the application; and
assign a designated one of the designated group of experimental variations to the designated user based on the user group number.

2. The system of claim 1, further comprising:
tag usage statistics of the designated user with the designated experimental variation.

3. The system of claim 1, further comprising:
randomly assign the user group number to the designated user.

4. The system of claim 1, wherein the user group number is greater than zero.

5. The system of claim 1, wherein the user group number is not unique to the designated user.

6. The system of claim 1, wherein each of the designated group of experimental variations is identified by a variation ID, wherein the designated experimental variation is identified by a designated variation ID, and wherein the designated experimental variation is assigned to the designated user if a result of a function based on the designated experiment ID and the user group number corresponds to the designated variation ID.

7. The system of claim 6, wherein the function is given by (X+Y) modulo Z,
where X=the designated experiment ID,
Y=the user group number, and
Z=a total number of experimental variations of the designated group of experimental variations.

8. The system of claim 6, wherein each of the variation IDs corresponds to a unique integer among the designated group of experimental variations.

9. A computer-implemented method for conducting a set of experiments on an application having a plurality of users, wherein each experiment is identified by a respective experiment identification (ID) and is associated with a respective group of experimental variations of the application, the method comprising:
assigning a user group number to a designated one of the plurality of users, the user group number being less than or equal to an entropy cap, the entropy cap being less than an expected entropy associated with the set of experiments, the expected entropy representing a total number of different states of the set of experiments, each of the different states comprising a respective experimental variation of each experiment;
determining a designated one of the set of experiments to be conducted on the application in connection with the designated user, wherein the designated experiment is identified by a designated experiment ID and is associated with a designated group of experimental variations of the application; and
assigning a designated one of the designated group of experimental variations to the designated user based on the user group number and the designated experiment ID.

10. The method of claim 9, further comprising tagging usage statistics of the designated user with the designated experimental variation.

11. The method of claim 9, wherein the user group number is randomly assigned to the designated user.

12. The method of claim 9, wherein the user group number is greater than zero.

13. The method of claim 9, wherein the user group number is not unique to the designated user.

14. The method of claim 9, wherein each of the designated group of experimental variations is identified by a variation ID, wherein the designated experimental variation is identified by a designated variation ID, and wherein the designated experimental variation is assigned to the designated user if a result of a function based on the designated experiment ID and the user group number corresponds to the designated variation ID.

15. The method of claim 14, wherein the function is given by (X+Y) modulo Z,
where X=the designated experiment ID,
Y=the user group number, and
Z=a total number of experimental variations of the designated group of experimental variations.

16. The method of claim 14, wherein each of the variation IDs corresponds to a unique integer among the designated group of experimental variations.

17. A machine-readable medium encoded with executable instructions for a method of conducting a set of experiments on an application having a plurality of users, wherein each experiment is identified by a respective experiment identification (ID) and is associated with a respective group of experimental variations of the application, the method comprising:
randomly assigning a user group number to a designated one of the plurality of users, the user group number being greater than zero and less than or equal to an entropy cap, the entropy cap being less than an expected entropy associated with the set of experiments, the expected entropy representing a total number of different states of the set of experiments, each of the different states comprising a respective experimental variation of each experiment;

determining a designated one of the set of experiments to be conducted on the application in connection with the designated user, wherein the designated experiment is identified by a designated experiment ID and is associated with a designated group of experimental variations of the application;

assigning a designated one of the designated group of experimental variations to the designated user based on the user group number and the designated experiment ID; and tagging usage statistics of the designated user with the designated experimental variation.

18. The machine-readable medium of claim 17, wherein the user group number is not unique to the designated user.

19. The machine-readable medium of claim 17, wherein each of the designated group of experimental variations is identified by a variation ID, wherein the designated experimental variation is identified by a designated variation ID, and wherein the designated experimental variation is assigned to the designated user if a result of a function based on the designated experiment ID and the user group number corresponds to the designated variation ID.

20. The machine-readable medium of claim 19, wherein the function is given by (X+Y) modulo Z, where X=the designated experiment ID,
Y=the user group number, and
Z=a total number of experimental variations of the designated group of experimental variations.

\* \* \* \* \*